US007735065B2

(12) United States Patent
Jain et al.

(10) Patent No.: US 7,735,065 B2
(45) Date of Patent: Jun. 8, 2010

(54) AGGREGATION AND PRIORITIZATION OF APPLICATION ISSUE DATA

(76) Inventors: Kalpit Jain, 6120 189th Pl. NE., Redmond, WA (US) 98052; Lokesh Gupta, 433 Belmont Ave. East #405, Seattle, WA (US) 98102; Jeffrey L. Ford, 1603 220th Pl. NE., Sammamish, WA (US) 98074

( * ) Notice: Subject to any disclaimer, the term of this patent is extended or adjusted under 35 U.S.C. 154(b) by 1128 days.

(21) Appl. No.: 10/714,153

(22) Filed: Nov. 14, 2003

(65) Prior Publication Data
US 2005/0108677 A1 May 19, 2005

(51) Int. Cl.
G06F 9/44 (2006.01)
G06F 11/00 (2006.01)
(52) U.S. Cl. .................. 717/125; 717/127; 714/38; 714/48
(58) Field of Classification Search ........... 717/101, 717/127, 128, 105, 112, 125, 131; 709/223, 709/225
See application file for complete search history.

(56) References Cited

U.S. PATENT DOCUMENTS

| 6,266,788 | B1 * | 7/2001 | Othmer et al. ............... 714/38 |
| 6,334,193 | B1 * | 12/2001 | Buzsaki ....................... 714/2 |
| 7,036,049 | B2 * | 4/2006 | Ali et al. ..................... 714/47 |
| 7,062,681 | B2 * | 6/2006 | Larsson et al. ............... 714/39 |
| 7,457,872 | B2 * | 11/2008 | Aton et al. ................... 709/224 |
| 2002/0087915 | A1 * | 7/2002 | Perla et al. ................... 714/15 |
| 2004/0015747 | A1 * | 1/2004 | Dwyer ........................ 714/47 |
| 2004/0167896 | A1 * | 8/2004 | Eakin .......................... 707/10 |
| 2004/0205727 | A1 * | 10/2004 | Sit et al. ..................... 717/125 |
| 2004/0220915 | A1 * | 11/2004 | Kline et al. ................... 707/3 |
| 2004/0249914 | A1 * | 12/2004 | Flocken et al. ............... 709/223 |
| 2005/0081108 | A1 * | 4/2005 | Shabalin ..................... 714/38 |
| 2005/0198556 | A1 * | 9/2005 | Tripp et al. .................. 714/726 |
| 2006/0242286 | A1 * | 10/2006 | Hawkins et al. .............. 709/223 |
| 2007/0180335 | A1 * | 8/2007 | Greenberg et al. ............ 714/46 |

OTHER PUBLICATIONS

"VitalApps™ Application Performance Management Software for Your Enterprise", retrieved from http://www.lucent.com/produ.../ 0,,CTID+2020-STID+10439-SOID+1454-LOCL+1,00,htm, pp. 1-3.
"Canadian Lawson Users Exchange (CLUE) Mission Statement", Clue Bylaws.
"DevTrack/Perforce Integration", TechExcel, www.techexcel.com, Feb. 2003.

* cited by examiner

Primary Examiner—Tuan Q Dam
Assistant Examiner—Isaac T Tecklu
(74) Attorney, Agent, or Firm—Turocy & Watson LLP

(57) ABSTRACT

A novel software application development aid comprises a web portal that provides aggregated and prioritized application issue data to ISVs in an ISV-specific and ISV-customizable manner so that the ISVs may improve their applications or correct errors therein and may know which application issues are causing the greatest reductions in customer satisfaction. So informed, the ISV may efficiently focus limited corrective resources on the most pressing problems. The application issue data sources for the ISV portal may include logo testing data, user crash report data, and other testing data.

24 Claims, 14 Drawing Sheets

1010
1013
1015

--- Systems Inc. - Products Rollups with OS Breakup

○ Without OS breakup   ⊙ Breakup by OS

Page 1 of 3   (Total Rows = 75)                                                  1 2 3   Next >>

| App Name | All 20 | OS | Blocking Issues | Quality Issues | FYI Issues | Total Issues |
|---|---|---|---|---|---|---|
| Aat | | Windows Server 2003 | 0 | 4 | 1 | 5 |
| Derfo | | Windows XP | 0 | 0 | 1 | 1 |
| Aatker | | unknown | 2 | 1 | 5 | 8 |
| Derfoat | | unknown | 1 | 1 | 4 | 6 |
| Aater | | unknown | 77 | 67 | 49 | 193 |
| Derfower | | Windows XP | 4 | 3 | 7 | 14 |
| Aatare | | Windows Server | 0 | 0 | 1 | 1 |

Page 1 of 25  (Total Issues = 850)

1 2 3 4 5 6 7 8 9 10  Next >>

ⓘ Use to Add/Remove from My Issues List

| ☐ | Issue ID A↓Z↓ | App Name + Version | OS | Issue Title | Issue Type | Test Case | Priority | Hits |
|---|---|---|---|---|---|---|---|---|
| ☐ | 23571 | Aat | Windows XP | : Reboots were suggested after the app and/or another 3rd party app were installed | Logo | 2.4 Inappropriate Reboots | Blocking | N/A |
| ☐ | 23572 | Derfo | Windows XP | : Installs files in the windows directory | Logo | 2.6 Install Shared Files | Blocking | N/A |
| ☐ | 23573 | Aatker | Windows XP | : Missing file version info | Logo | 2.3 Overwrite Prop Files | Blocking | N/A |

AGGREGATION AND PRIORITIZATION OF APPLICATION ISSUE DATA

FIELD OF THE INVENTION

This invention relates generally to software development and, more particularly, relates to a system and method for identifying and prioritizing software application errors for presentation and resolution.

BACKGROUND

Software applications are an important factor in the usefulness and popularity of computer systems as a whole. In particular, a computer system typically comprises an operating system for interacting with the computer itself, as well as applications that use the computer by interfacing with the operating system or otherwise using the facilities of the operating system. Thus, successful identification and resolution of application issues, e.g. defects, is important to both the application vendor and the operating system vendor.

Computer software applications can typically fail in a great number of different ways, and it is economically and technologically difficult and impractical to identify and resolve every point of potential failure prior to distribution of an application. However, it is an unsound business practice to indefinitely leave a large number of defects unresolved, since such would place a great burden on users that may experience problems due to these defects. As such, software application vendors typically iteratively improve their products based on testing, consumer feedback, and so on. However, there is currently no easy way for application vendors to identify the frequency, severity, and overall user impact of particular defects and to focus their corrective efforts in the most productive manner.

BRIEF SUMMARY OF THE INVENTION

A novel software application development aid is described herein. In particular, in an embodiment of the invention, a portal is provided for independent software vendors (ISVs). The portal aggregates application issue data from at least two sources and prioritizes the data in an ISV-specific and ISV-customizable manner. In an embodiment of the invention, the data sources for the ISV portal include logo testing data, user crash report data, and other testing data.

In a further embodiment of the invention, the ISV portal presents a web page that enables each ISV to view application issue data and to select and have presented the data that is most important to that ISV. Views available in an embodiment include an "Issue Summary" view, a "Product Rollup" view, a "Full Issue List" view, and a "My Issue List" view. Further views are contemplated within the scope of the invention.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 10B is a diagram of a user interface for viewing and interacting with product application issue data according to an embodiment of the invention, wherein the data is listed according to operating system;

FIG. 11 is a diagram of a user interface for viewing and interacting with a full issue list according to an embodiment of the invention;

DETAILED DESCRIPTION

The invention pertains to the resolution of software application issues such as errors or malfunctions, and encompasses, in embodiments of the invention, a novel system and architecture for aggregating, prioritizing, and presenting application issue data in an easy-to-use manner for the use of software application developers. It will be appreciated that while the examples herein focus on the use of such data by software application developers, the invention is more widely applicable and is not limited to such use.

The invention operates in a computer environment. In an embodiment of the invention, the described process operates on a collection of one or more computing devices, with the results, e.g. aggregated and prioritized application issue data, being obtainable by application vendors via an Internet portal. A suitable computing device usable in implementing all or some aspects of the invention will be first described with references to FIG. 1, after which a network environment according to a particular environment will be more fully described with reference to FIG. 2.

Although there are many computing devices suitable for implementing the invention, several exemplary types of computing devices are discussed below with respect to FIG. 1. It will be appreciated that this explanation is given for ease of understanding and is not intended to limit the scope of the invention.

Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 1:
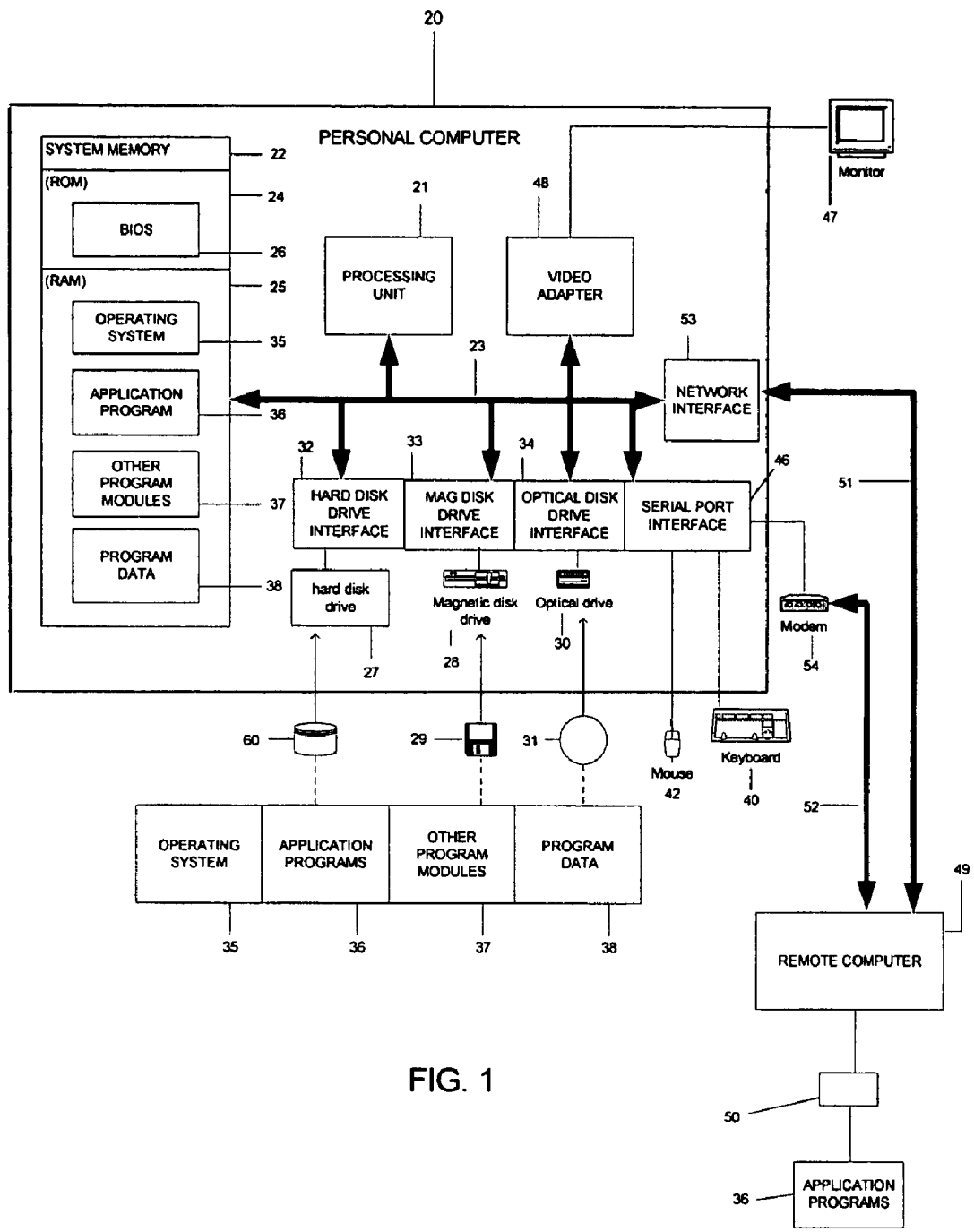
FIG. 1 is a block diagram generally illustrating an example device architecture in which all or a part of embodiments of the present invention may be implemented.

Turning now to FIG. 1, a general purpose computing device is shown in the form of a conventional computer 20, including a processing unit 21, a system memory 22, and a system bus 23 that couples various system components including the system memory to the processing unit 21. The system bus 23 comprises one or more physical busses of any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment. A number of program modules may be stored on the hard disk 60, magnetic disk 29, optical disk 31, ROM 24 or RAM 25, including an operating system 35, one or more applications programs 36, other program modules 37, and program data 38.

A user may enter commands and information into the computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, computers may include other peripheral output devices, not shown, such as speakers and printers.

The computer 20 operates in a networked environment using logical connections to one or more remote computers, such as a remote computer 49. The remote computer 49 may be a domain controller, server, a router, a network PC, a personal computer, one or more databases, a peer device or other common network node, and typically includes many or all of the elements described above relative to the computer 20. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the WAN 52. The modem 54, which may be internal or external, is connected to the system bus 23 via the serial port interface 46. Program modules depicted relative to the computer 20, or portions thereof, may be stored in a remote memory storage device if such is present. It will be appreciated that the network connections shown are exemplary and other means of establishing a communications link between the computers may be used.

Herein, the invention will generally be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware. In the following discussion, computing devices such as clients, domain controllers, servers, and so on may be of the architecture as described above with respect to FIG. 1 regarding computer 20 and/or remote computer 49, or may alternatively have any other type of architecture. In an embodiment of the invention, the methods, modules, and data structures described herein are implemented via computer-executable instructions on a computer-readable medium, such as a magnetic or electronic storage or transmission medium.

Figure 2:
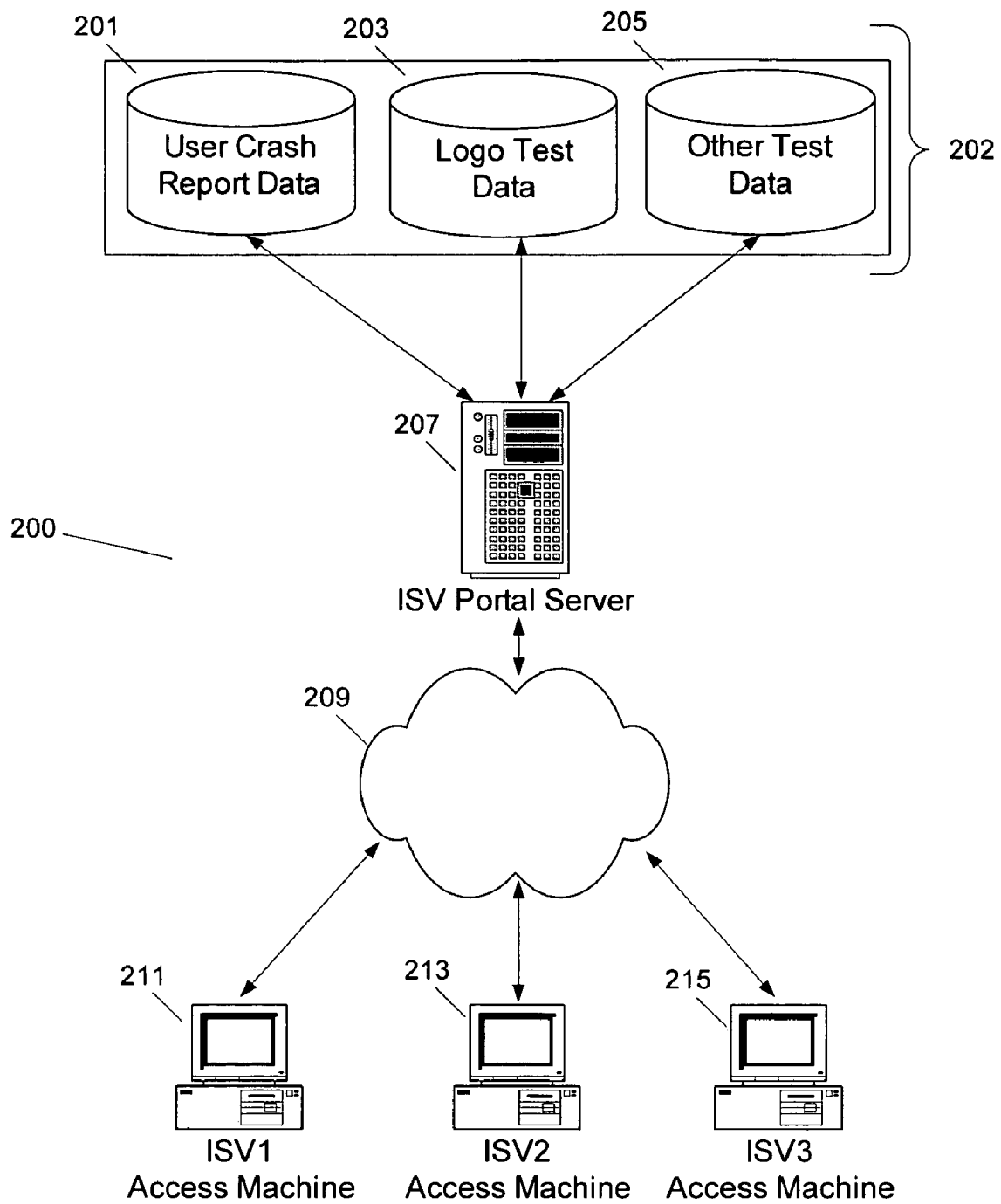
FIG. 2 is a network diagram of an architecture for implementing an application issue aggregation, prioritization, and presentation system according to an embodiment of the invention.

FIG. 2 illustrates in schematic form a network architecture for implementing a technique according to an embodiment of the invention. In particular, the network architecture 200 comprises a set 202 of databases and a portal server 207 connected to a network 209 such as the Internet or other network. The set of databases 202 stores application issue data, and in an embodiment of the invention comprises a User Crash Report database 201, a Logo Test database 203, and a database 205 of other test data.

The User Crash Report database 201 may comprise error information generated pursuant to user mode crashes experienced during use of an application by an actual end user. This type of data is sometimes referred to as "Watson" data. For example, a user of the Windows™ XP brand operating system, produced by Microsoft® of Redmond, Wash., is prompted to send crash data to Microsoft® whenever a user mode crash occurs. The data transmitted typically includes data identifying memory contents at the time of the crash as well as information usable to identify the application or applications running at the time of the crash.

The Logo Test database 203 typically comprises data generated by the operating system developer in the course of testing applications to ensure that the applications operate in a manner that is consistent with the operating system's quality and functionality. Typically, if an application meets certain criteria in this regard, then it is certified by the operating system developer so that the application vendor may use the operating system developer's name or logo in connection with the sale of the relevant application.

Finally, the Other Test Data database 205 comprises data derived from any other testing. For example, the operating system developer may test an application for user experience issues, or any other issues that may be related or unrelated to logo test issues and/or crash issues. The results of such additional tests are stored in the database 205.

According to an embodiment of the invention, the portal server 207 collects application issue data from the set 202 of data bases and presents that data to independent software developers (ISVs) in an aggregated and prioritized fashion, to be discussed in greater detail below. In overview, the data collection and aggregation process executed by the portal 207 is as shown in the flow chart of FIG. 13 in an embodiment of the invention. In particular, at step 1301, application issue data is gathered from a number of data sources, such as the set of databases 202. Subsequently at step 1303 the application issue data is aggregated, i.e. application issues pertaining to the same application are grouped together. Note that such grouping may be by any convenient mechanism, such as by physically grouping the data in storage or by associating flags or identifiers with data items that identify the group to which the data belongs. Finally, at step 1305, the aggregated application issue data is presented to the ISV associated with the application to which the group pertains.

In order to access the data from the portal 207, an ISV logs into the server 207 over the network 209. Typically a computing device will be used by the ISV, and exemplary ISV access machines 211, 213, 215 (respectively ISV1 Access Machine, ISV2 Access Machine, and ISV3 Access Machine) are shown in FIG. 2. In an embodiment of the invention, ISVs are only able to access only information that pertains to their own applications. As such, in an embodiment of the invention, an ISV must use a password or other authentication to log in to the server 207.

Figure 3:
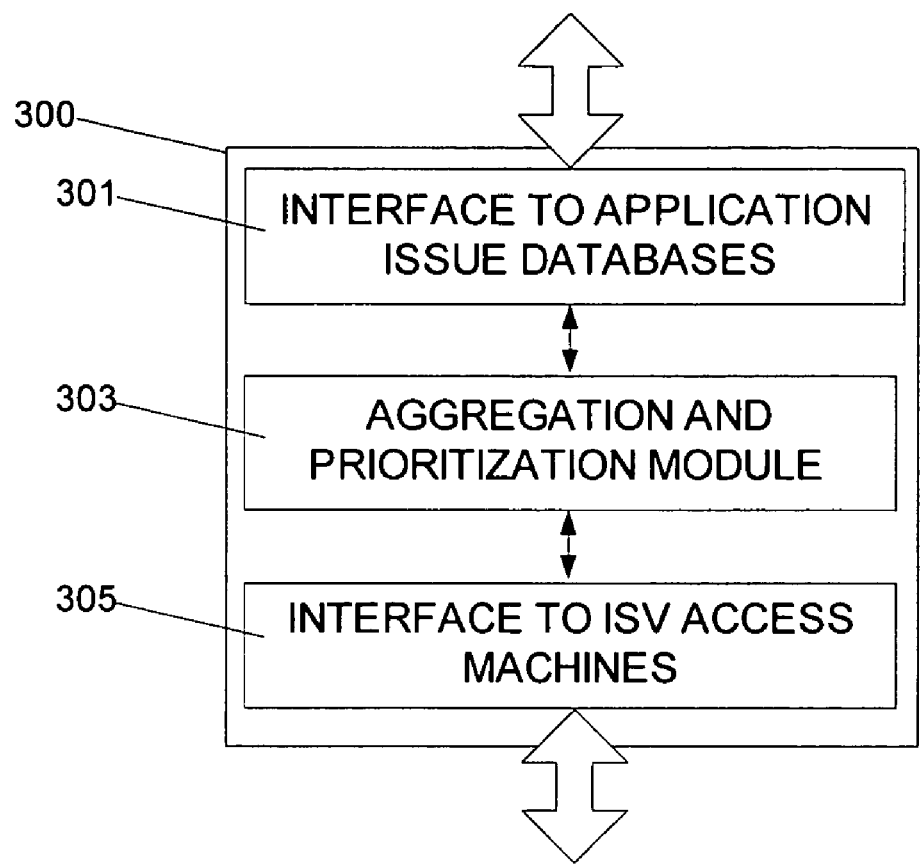
FIG. 3 is a schematic diagram of an architecture according to an embodiment of the invention for interfacing to application issue data sources, and for aggregating and prioritizing said data for presentation to ISVs.

A basic architecture for a portal server according to an embodiment of the invention is shown in FIG. 3. In particular, the server 300 comprises an interface 301 to the application issue databases or other application issue data sources, as well as an interface 305 to the ISVs via the respective ISV access machines. An application issue aggregation and prioritization module 303 is communicably linked to both the interface 301 to the application issue databases and to the interface 305 to the respective ISV access machines.

In overview, as discussed above, the application issue aggregation and prioritization module 303 obtains application issue data via the interface 301 from one or more application issue data sources. In an embodiment of the invention, the module 303 then aggregates issues that pertain to a particular application and prioritizes the aggregated issues according to criteria, examples of which will be discussed in greater detail below. Finally, a particular ISV accesses the module 303 via the interface 305 to obtain aggregated prioritized data for their application, so that appropriate corrective steps may be taken. Note that the step of aggregating and prioritizing data may occur prior to an access or request by an ISV, or may occur only pursuant to such as access or request.

Figure 4:
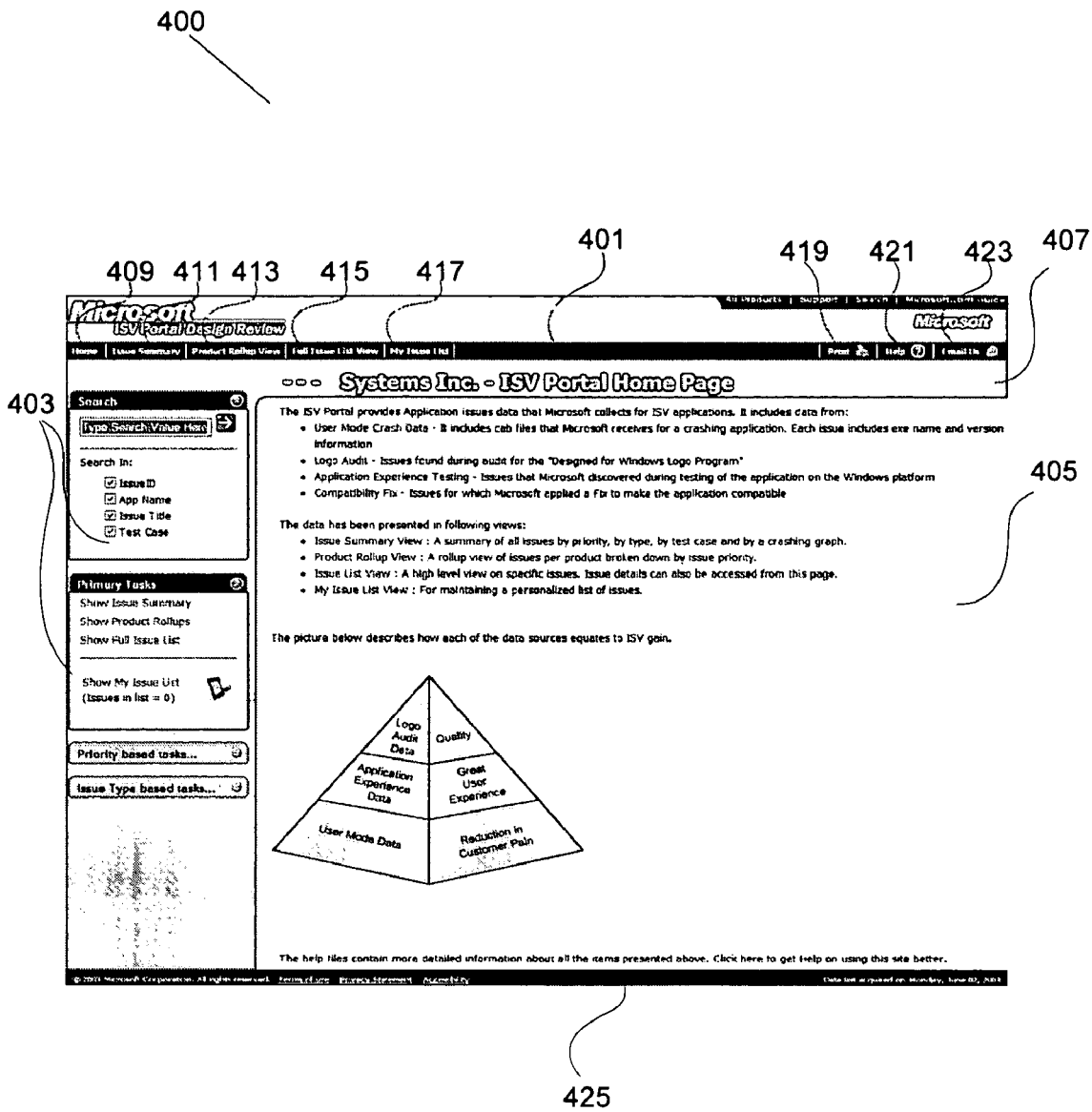
FIG. 4 is a diagram of a user interface corresponding to an ISV portal according to an embodiment of the invention.

FIGS. 4 through 12 illustrate the aggregation, prioritization, and presentation of application issue data in a customizable and informative user interface, In particular, FIG. 4 shows an exemplary user interface 400 representing an ISV's portal or "home page" for the described system. The ISV may proceed directly to this page upon login to the portal server or may be routed to this page from another page or site.

The user interface 400 comprises primarily a menu bar 401, a left option menu 403, a right content section 405, and a right header bar 407. The menu bar 401 will be discussed with reference to FIG. 4, after which the remaining portions of the home page indicated above will be discussed by way of other Figures. In the illustrated embodiment, the menu bar 401 sets forth five main options including a "Home" option 409, an "Issue Summary" option 411, a "Product Rollup View" option 413, a "Full Issue List View" option 415, and a "My Issue List" option 417. The menu bar 401 may also present other standard options such as a "Print" option 419, a "Help" option 421, and a contact option such as an "Email Us" option 423.

The "Home" option 409 when selected links the user back to the home page of the ISV portal site for the company. If the user is already at the home page then the "Home" option 409 has no effect. The "Issue Summary" option 411, when selected, is operable to show the user an Issue Summary in the contents pane of the page (e.g. in space 405). This selection is also available from the "Primary Tasks" Flyout menu on the left pane 403. Clicking this link will act to highlight the corresponding row in the "Primary Tasks" flyout menu.

The "Product Rollup View" option 413, when selected, is operable to show the users a Products Rollup Page in the contents pane of this page. As with the "Issue Summary" option 411, this selection is also preferably available from the "Primary Tasks" flyout menu on the left pane 403. Clicking this link may also highlight the corresponding row in the "Primary Tasks" flyout menu of pane 403. The "Full Issue List View" option 415 is operable when selected to show all the issue information available for the particular ISV. This selection is also preferably made available from the "Primary Tasks" flyout menu on the left pane 403, and clicking the "Full Issue List View" option 415 may also act to highlight the corresponding row in the "Primary Tasks" flyout menu.

The "My Issue List" option 417 is operable when selected to show all issues that an ISV user may have previously added to their "My Issues" list. As with the other options discussed above, selection of the "My Issue List" option 417 may act to highlight a corresponding row in the "Primary Tasks" flyout menu in pane 403.

The "Print" option 419, "Help" option 421, and "Email Us" option 423 all preferably act in a predictable manner. For example, in an embodiment of the invention, the "Print" option 419 acts to open up a print dialog box. In a further embodiment of the invention, only the contents pane 405, Right Header Bar 407, and a page footer such as footer 425 are printed. The "Help" option 421 is operable to open up a Help page. In an embodiment of the invention, the Help page is opened in a new browser window. Finally, in an embodiment of the invention the "Email Us" option 423 is operable to open a new email with a pre-entered address or alias corresponding to the host of the ISV portal.

Figure 5:
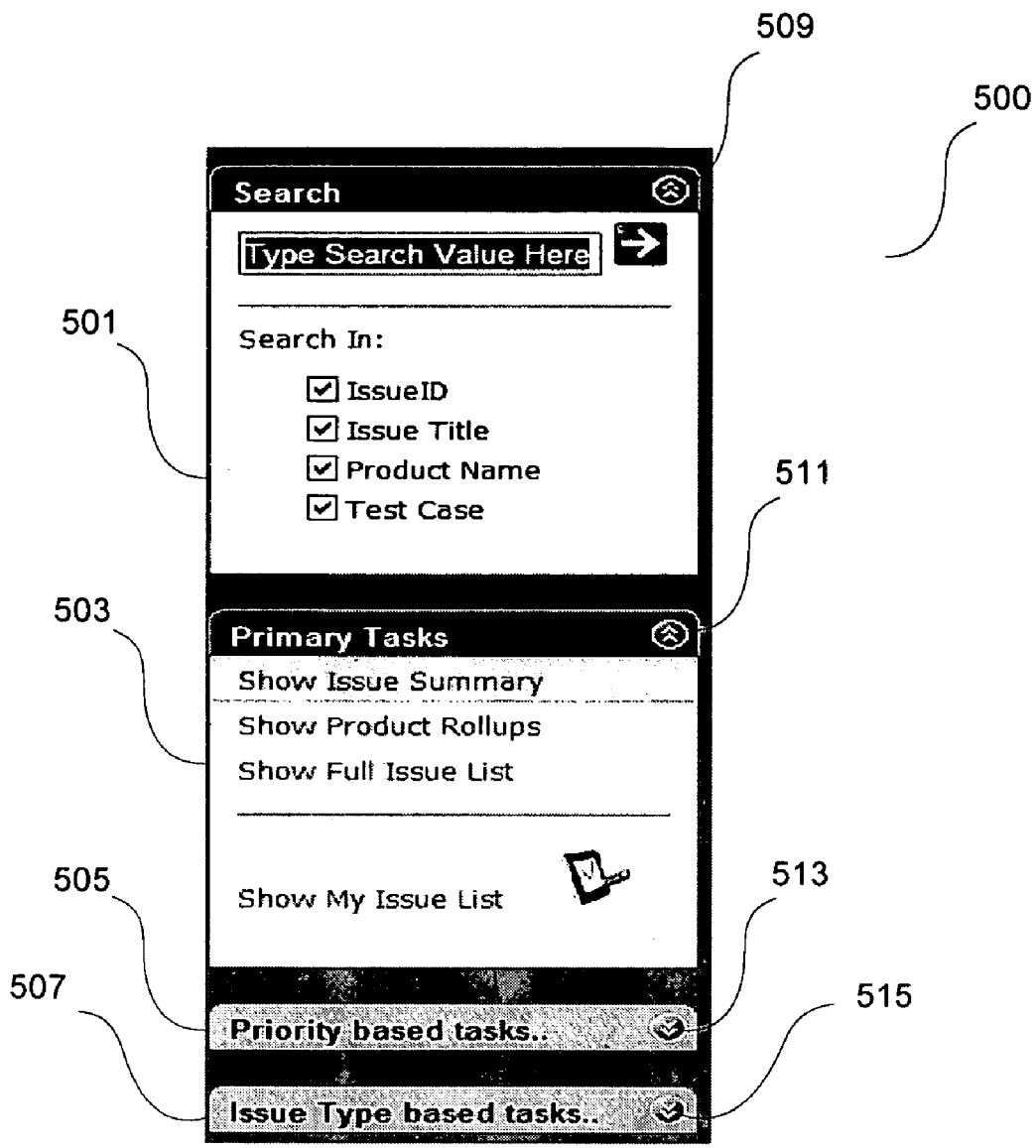
FIG. 5 is a diagram of a user interface for viewing and selecting menu options according to an embodiment of the invention.
Figure 6:
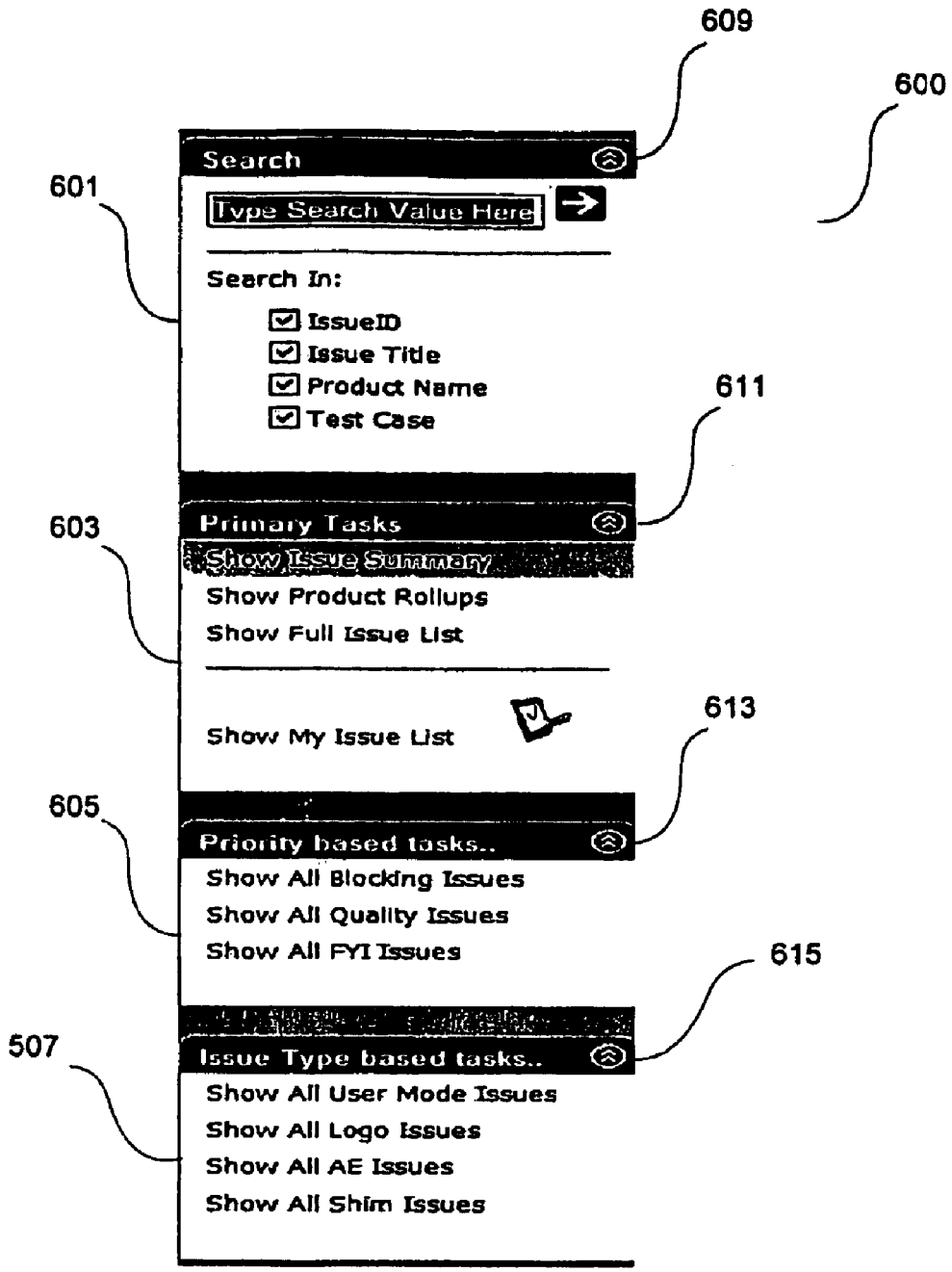
FIG. 6 is a diagram of a further user interface for viewing and selecting menu options according to an embodiment of the invention.

Although certain aspects of the left hand pane 403 have been discussed with reference to FIG. 4, a more detailed description will be given with reference to FIGS. 5 and 6. In particular, the user interface image 500 shown in FIG. 5 is the default setting in an embodiment of the invention for the left menu pane when a user visits the page for the first time. Subsequent refreshes of the page preferably carry forward the left menu settings. The user interface image 600 of FIG. 6 shows the user interface of FIG. 5 wherein the flyout controls have been used to expand the "Priority Based Tasks" menu 505 and the "Issue Type Based Tasks" menu 507 to yield a full "Priority Based Tasks" menu 605 and a full "Issue Type Based Tasks" menu 607.

Note that each menu is expanded or collapsed by selection of a flyout control on the top right of the menu header. These controls are shown as elements 509, 511, 513, and 515 in FIG. 5 and elements 609, 611, 613, and 615 in FIG. 6. Further, in an embodiment of the invention, clicking on any menu item causes the page to refresh. The new page preferably has the corresponding information in the contents pane.

Figure 7:
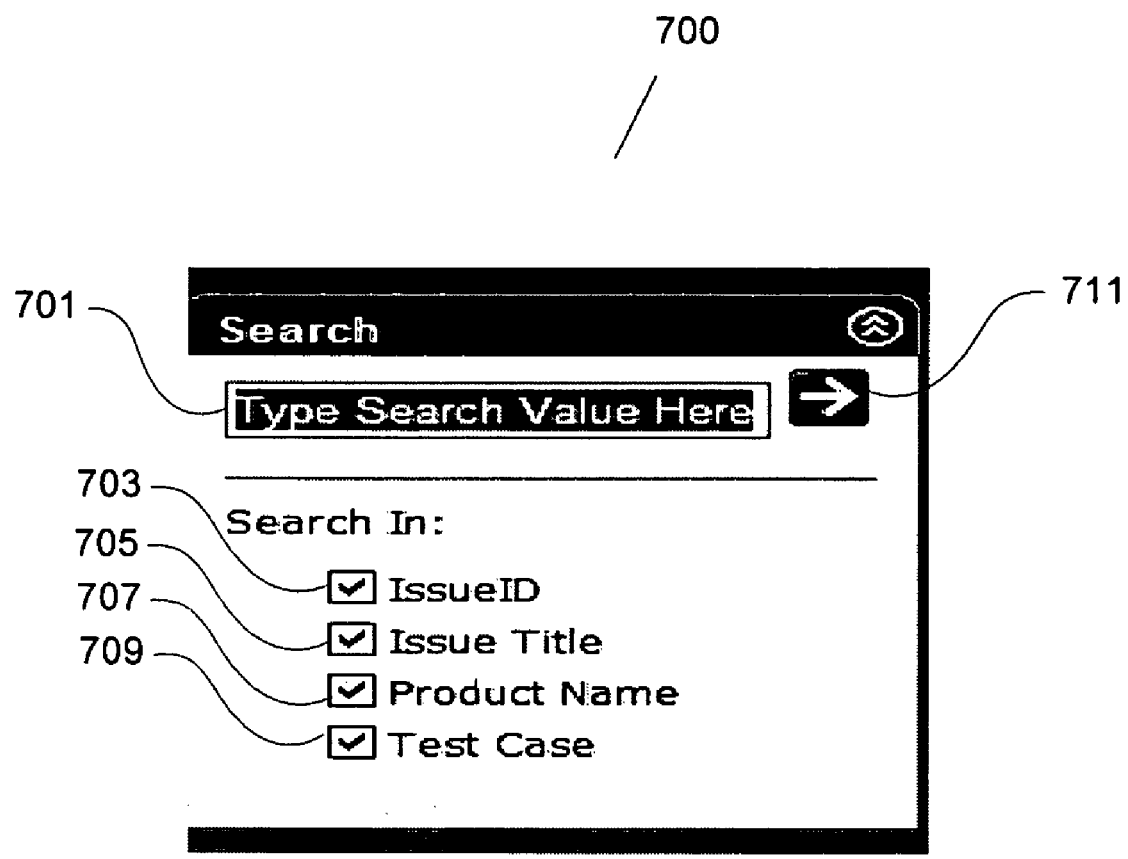
FIG. 7 is a diagram of a user interface for viewing and selecting application issue data search options according to an embodiment of the invention.

The search menu, shown as element 501 and 601 in FIGS. 5 and 6 respectively, will be discussed in greater detail with reference to FIG. 7. The search menu 700 provides the user a way of searching through the application issue data files (e.g. XML files) maintained by the portal server for strings of interest, and to specify filters for this search. Typically the search menu 700 may be the menu of greatest initial importance to the user and so has the default focus when the page is loaded in an embodiment of the invention. The contents 701 of the menu 700 are also selected by default in an embodiment of the invention.

In an embodiment of the invention, the user fills in the search field 701 to provide a list of one or more words to search for in the application issue data files. In addition, the user may also select one or more search filters 703, 705, 707, 709 to further define the searched portions of the application issue data files. Preferably the value of the search field 701 and the selections on the search filters 703, 705, 707, 709 are maintained between refreshes of the page. Pressing "Enter" on the keyboard of the computing device used by the user to access the portal server while the user interface focus is on the text box 701, or clicking on the arrow image 711 starts the search in an embodiment of the invention. Preferably, error conditions are noted to the user via an audible notification and/or a dialog box. Potential error conditions include: when the user has not filled in the search string, when the search string has no text, when the search string contains a double quote (this character may cause problems in XML parsing and is preferably disallowed in an embodiment of the invention), and when none of the checkboxes for filters are checked.

The behavior of the various filters will now be discussed in greater detail. When the IssueID filter 703 is selected, each word in the search string 701 is looked for individually in the IssueID present in the XML data representing application issues. For example, if the search string is "30021 30098 20456", then the three issues ids are shown as the return set. When the Product Name filter 707 is selected, an exact word match for each search term is searched for in application name information in the XML data. For example, if "Joe" is the search string, then only applications with the word "Joe" in their name (as a separate word) will be returned. If "Joe Jo" is given in the search string, only applications which have both words (as separate words) will be returned. Applications with only one or the other word in their name will not be returned. In addition, if the search string(s) provided form only a part of a word in an application name, such cases will not be shown in the search results.

When the IssueTitle filter 705 is selected, an exact word match in the issue title is sought for each search term in the issue title information in the application issue XML data on the portal server. Finally, when the when the Test Case filter 709 is selected, an exact word match for each search term is searched for in test case identifying information in the XML data. Test cases may include for example, the following tests or any other tests additionally or alternatively:

T1.1 Perform primary functionality and maintain stability
T1.1.1 Perform primary functions and maintain stability during functionality testing
Test for the application hanging, crashing, losing data, or incorrect system behavior:
T1.1.2 When used with a mouse with more than three buttons
T1.1.3 Use only each user's assigned temporary folder for temporary files
T1.1.4 When presented with long paths, file names and printer names
T1.1.5 When installed and run on a dual-processor system
T1.1.6 When devices are not installed
T1.1.7 Switches back to system color mode on exit, if application requires 256-colors
T1.2 Kernel mode drivers must pass verification testing
T1.3 Device and filter drivers must pass Windows HCT testing
T1.4 Perform Windows version checking correctly
T1.5 Support Fast User Switching
T1.6 Support new visual styles
T1.7 Support switching between tasks
T2.1 Do not replace files protected by Windows File Protection
T2.2 Migrate from earlier versions of Microsoft® Windows®
T2.2.1 Migrate from Windows 98 to Windows XP Home Edition
T2.2.2 Migrate from Windows Me to Windows XP Home Edition
T2.2.3 Migrate from Windows 98 to Windows XP Professional
T2.2.4 Migrate from Windows Me to Windows XP Professional
T2.2.5 Migrate from Windows NT® 4.0 Workstation to Windows XP Professional
T2.2.6 Migrate from Windows 2000 Professional to Windows XP Professional
T2.T3 Do not overwrite non-proprietary files with older versions
T2.4 Do not require a reboot inappropriately
T2.5 Install to Program Files by default
T2.6 Install any shared files to the correct locations
T2.7 Support Add or Remove Programs properly
T2.8 Support "All Users" installations
T2.9 Support Autorun for CDs and DVDs
T3.1 Default to the correct location for storing user-created data
T3.2 Classify and store application data correctly
T3.3 Deal gracefully with access-denied scenarios
T3.4 Support running as a Limited User With respect to any search, wild card support is provided in an embodiment of the invention such that a wild card character such as "$" or "*" can be used in the search text field 701 to right truncate and/or left truncate search terms. In addition, although certain filters are described above as causing exact term searches, it will be understood that any other search convention is also acceptable depending upon designer preferences. For example, it in an embodiment of the invention, the aggregation and prioritization module automatically searches for similar words and terms to those in the search field 701 rather than only for exact matches to such words and terms.

Figure 8:
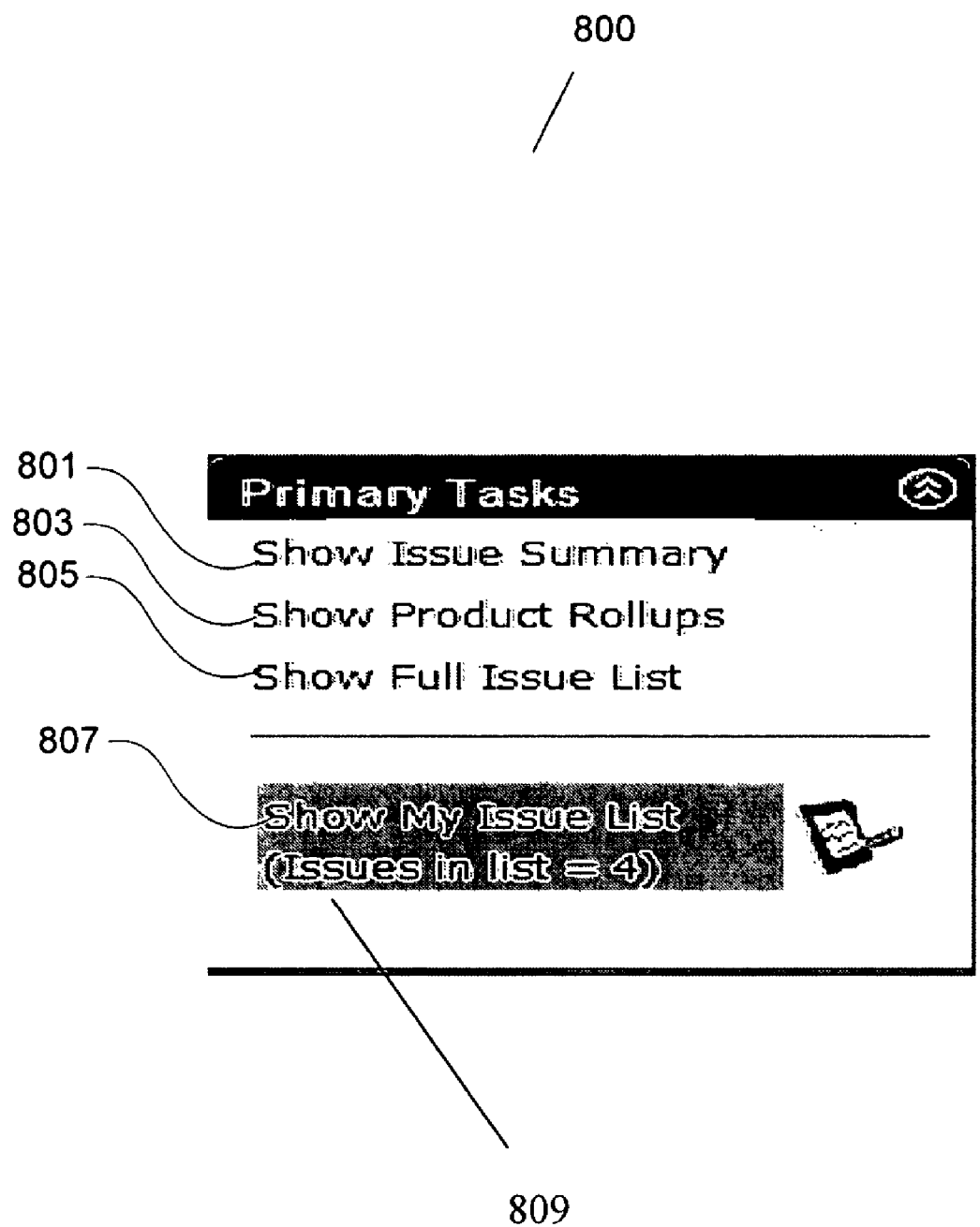
FIG. 8 is a diagram of a user interface for viewing and selecting primary task options according to an embodiment of the invention.

Turning now to FIG. 8, the Primary Tasks menu option 503, 603 will be discussed in greater detail. In particular, four primary Tasks are provided within the Task Menu 800 in an embodiment of the invention for users to arrange the presentation of issue data. The tasks illustrated include Show Issue Summary 801, Show Product Rollups 803, Show Full Issue List 805, and Show My Issue List 807. In an embodiment of the invention, the "Issues in List" field 809 shows the number of issues that are currently in the current vendor's "My Issue" list for the machine. Preferably, this information is enabled via the use of cookies on the ISV's access machine.

Figure 9:
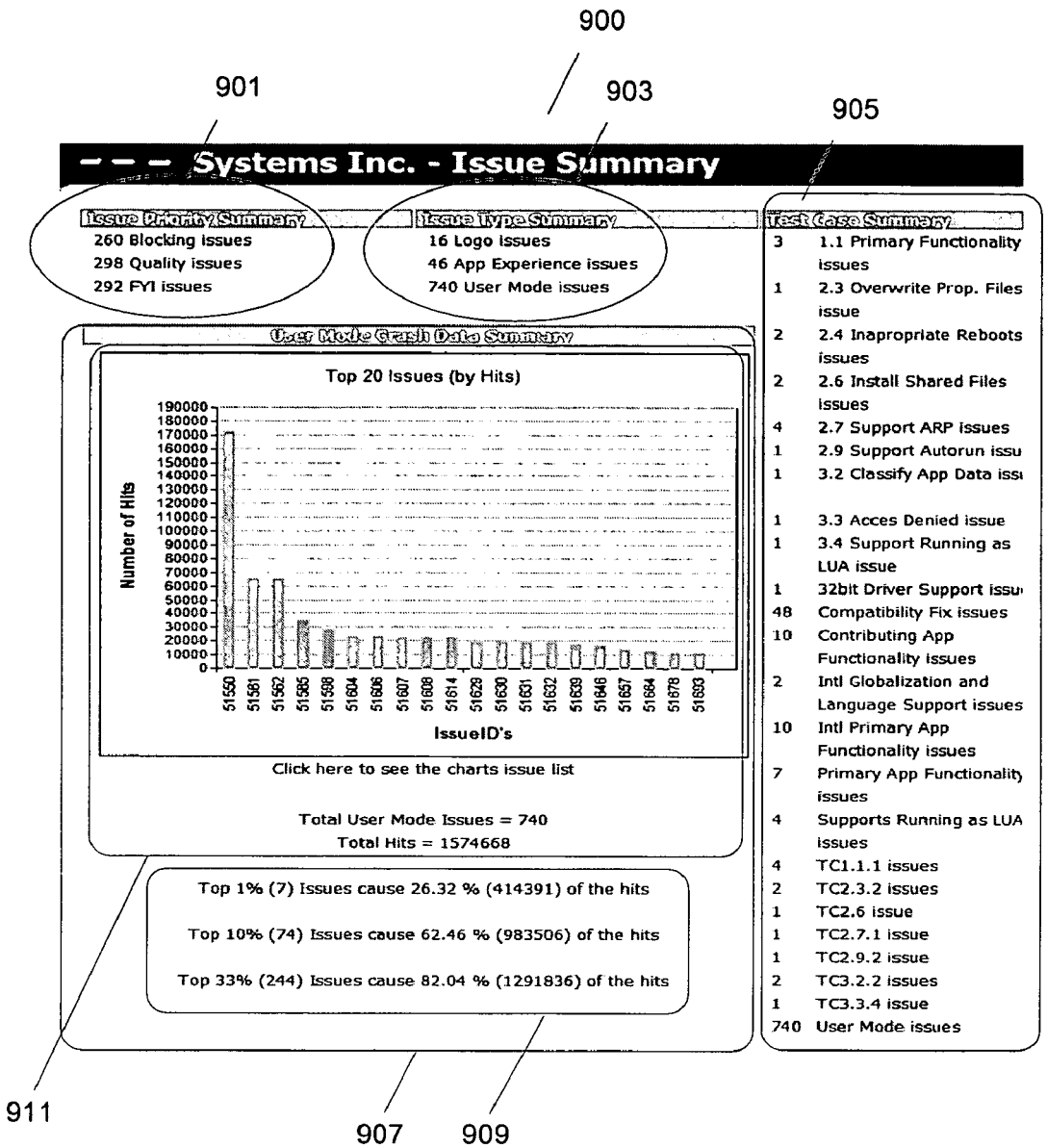
FIG. 9 is a diagram of a user interface for viewing and interacting with application issue summary information according to an embodiment of the invention.

The behavior of each task will be described in greater detail below with reference to FIGS. 9-12. The view presented according to selection of the Show Issue Summary 801 option in an embodiment of the invention is illustrated in FIG. 9. The Issue Summary view 900 includes a number of useful features in an embodiment of the invention. In particular, the Issue Priority Summary field 901 presents a count of total issues per Issue Priority for the ISV. Issue priorities in the illustrated example include, in order, "Blocking," "Quality," and "FYI."

In an embodiment of the invention, high priority issues (Blocking Issues) include Logo blocking issues, deployment blocking issues, as well as the top 33% of user mode issues (based on descending order of hits). In this embodiment of the invention, medium priority issues include application experience or Logo audit issues which impact application quality and customer experience, and also include the middle range (33% to 66%) of user mode issues (based on descending order of hits). Finally, the lowest category of priority includes in this embodiment of the invention all compatibility fix issues and the remaining user mode issues (66% to 100% of user mode issues based on descending order of hits).

The Issue Type Summary field 903 presents a listing of the respective numbers of issues per Issue Type for the ISV. Issue types included in the illustrated example include Logo, AE and User Mode. As discussed above, Logo issues are those found during certification testing for use of the OS developer's logo or brand, AE issues are those identified during experiential or other testing, and User Mode issues are those reported pursuant to actual crashes as reported by users. The Test Case Summary field 905 gives the ISV a Count of total issues per Test Case. The list of Test Cases may be sorted in any convenient manner, such as by issue name in ascending order.

The User Mode Crash Data Summary field 907 gives detailed information about User Mode crashes, as these are typically of greatest priority to the ISV. The field 907 includes both textual 909 and graphical 911 information to aid the ISV user in an embodiment of the invention. With respect to the textual information 909, the text lists what percentage of issue reports the top 1%, 10%, and 33% of issues are causing. In addition to percentages, the actual raw numbers of issues and reports are also given in the illustrated embodiment of the invention. For example, it is shown that 1% of the reported issues (i.e. 7 issues) are responsible for 26.32% of the issue reports, which is 414391 reports. Each such statement also links to the issue list page which displays only the top 1%, 10%, or 33% of issues respectively in an embodiment of the invention. In a further embodiment of the invention, each statement is only visible if there is at least one issue to list in that percentage category.

With respect to graphical information 911, the illustrated graph shows the top 20 Watson Issues (by numbers of reports) in an embodiment of the invention. The vertical axis of the graph may change calibration depending on the highest report count. The vertical axis is also preferably scaled in appropriate numbers and sizes of divisions given the report counts. For example, if it is desired to show at most 20 divisions on the y-axis, then the following rules may be used: if Max(hit count)/20<10, y-axis calibrates at 10, if 10<Max(hit count)/20<50, y-axis calibrates at 50, if 50<Max(hit count)/20<100, y-axis calibrates at 100, if 100<Max(hit count)/20<500, y-axis calibrates at 500, if 500<Max(hit count)/20<1000, y-axis calibrates at 1000, if 1000<Max(hit count)/20<5000, y-axis calibrates at 5000, if 5000<Max(hit count)/20<10000, y-axis calibrates at 10000, if 10000<Max(hit count)/20<50000, y-axis calibrates at 50000, and if 50000<Max(hit count)/20<100000, y-axis calibrates at 100000.

Figure 10A:
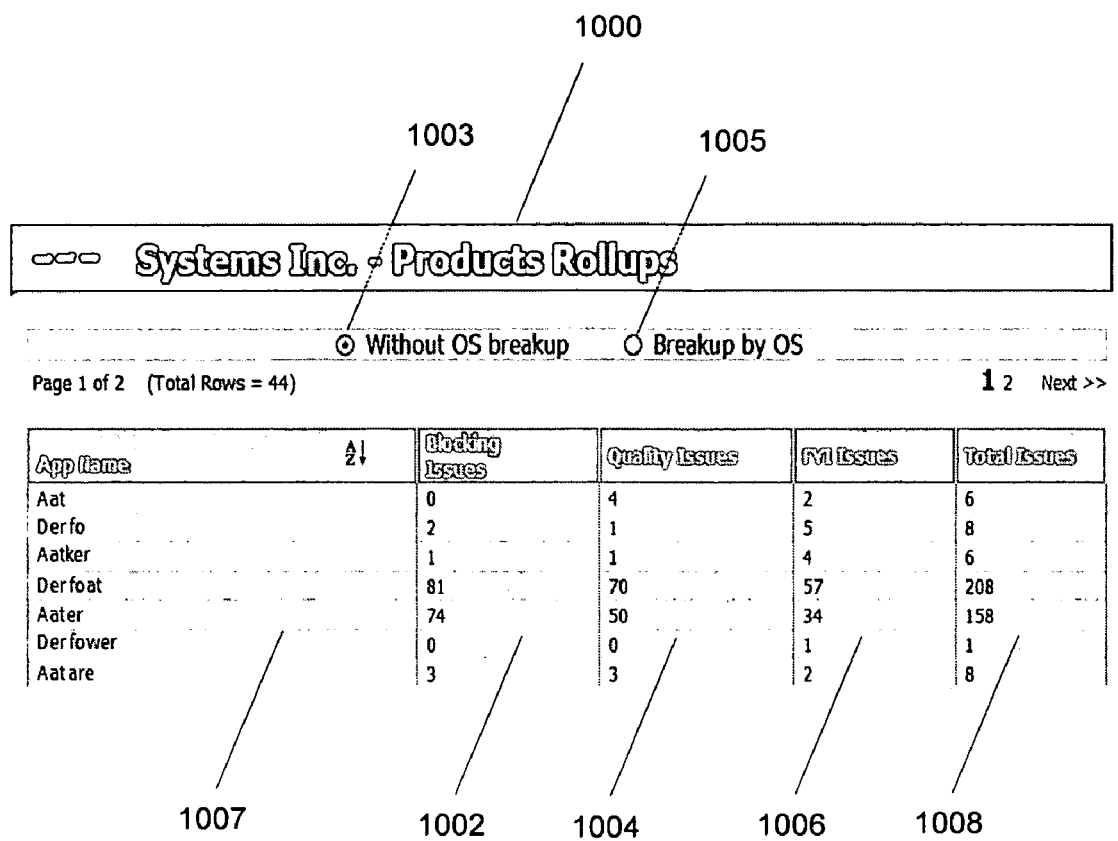
FIG. 10A is a diagram of a user interface for viewing and interacting with product application issue data according to an embodiment of the invention, wherein the data is not listed according to operating system.

With respect to the Show Product Rollups view resulting from selection of the Show Product Rollups view option 803, FIGS. 10A and 10B show two such views. In FIG. 10A, the Product Rollups view 1000 lists issues that are not broken down by the relevant operating system, whereas in the view 1010 of FIG. 10B, the issues are presented broken down by operating system. The choice between these views may be made by selection of a control or of a fill-in element(s) such as selection controls 1003, 1005, 1013, and 1015.

The presentation 1000 shown in FIG. 10A without operating system break-down is the default view according to an embodiment of the invention. Preferably the view 1000 shows all the applications for the ISV that have issues in field 1007. In addition, the issue data for each application may be broken down by Issue Priority, such as in fields 1002, 1004, and 1006. In addition, the total number of issues for each application is also preferably given in field 1008.

In an embodiment of the invention, the application name in field 1007 hyperlinks to an Issue list that shows all the issues for the selected applications. Similarly, the relevant blocking issue data item in field 1002 links to an Issue list that shows all the Blocking issues for the corresponding application, the relevant Quality Issue Data Item in field 1004 links to an Issue list that shows all the Quality issues for the corresponding application, and the relevant FYI Issue Data Item in field 1006 links to an Issue list that shows all the FYI issues for the corresponding application.

In a further embodiment of the invention, the each Total Issues Data Item in field 1008 links to an Issue list that shows all the issues for the corresponding application in the same manner as selecting the application name in field 1007. Furthermore, clicking on any header in the table 1000 sorts the table by alphabetical and/or numerical ascending and then descending order on sequential clicks with respect to the relevant data field. Preferably the table 1000 is sorted by only one column at any given time. In an embodiment of the invention, the default sort order is by application name.

The presentation 1010 shown in FIG. 10B with operating system break-down is selectable according to an embodiment of the invention as discussed above. The presentation 1010 has the same features as the presentation 1000 shown in FIG. 10A, and in addition has a field 1017 for breaking down the listed issues by operating system. The data items are again selectable to link to specific representations, however, note that each row in the table 1010 is now operating system-specific, so that selecting, for example, an application name will list all issues for that application when run on the specified operating system.

The full issue list view 1100, shown in FIG. 11, shows all existing issues for the current ISV user. The full list view 1100 may be accessed in a number of ways, including in an embodiment of the invention by selecting the full list view menu option 805 in the primary tasks pane 800, or otherwise as discussed above. In an embodiment of the invention, the default sort order of the issues is by IssueID (field 1101).

As with the chart discussed above, each column in the table 1100 is preferably sortable by clicking on the column header. The "App Name+Version" column may first sort by application name and then by version, with the version being treated as a string while sorting. Clicking on any row (or on the Issue ID link, such as element 1103), opens the Issue Details page, to be discussed below. The checkboxes in field 1105 are usable by the user to identify issues of importance to the ISV (e.g. "my issues"). Clicking on the checkbox in the table header should check/uncheck all the checkboxes on the table. If a checkbox inside a data row is checked, it should have already been added to the My Issue list. This holds true for explicit checking by the user or checking done by clicking on the checkbox in the header.

A paging section 1107 (also visible on the Product Rollup and Issue List Pages) is used to navigate pages of data within the relevant interface. Clicking on the page number takes the user to the corresponding page, while clicking on "next>>" takes the user to the subsequent page in the list if any. If there are more than 10 pages, then clicking on "10" shows a new list of pages starting from 10 and ending at 20, etc. In an embodiment of the invention, sorting of data such as clicking a column header acts to sort the entire data set, not just the displayed page thereof. Accordingly, if the user is on a given page and sorts the Data Table, the user stays on the given page number, but the results shown on this page may now be different from the previously shown set due to the sorting.

Figure 12:
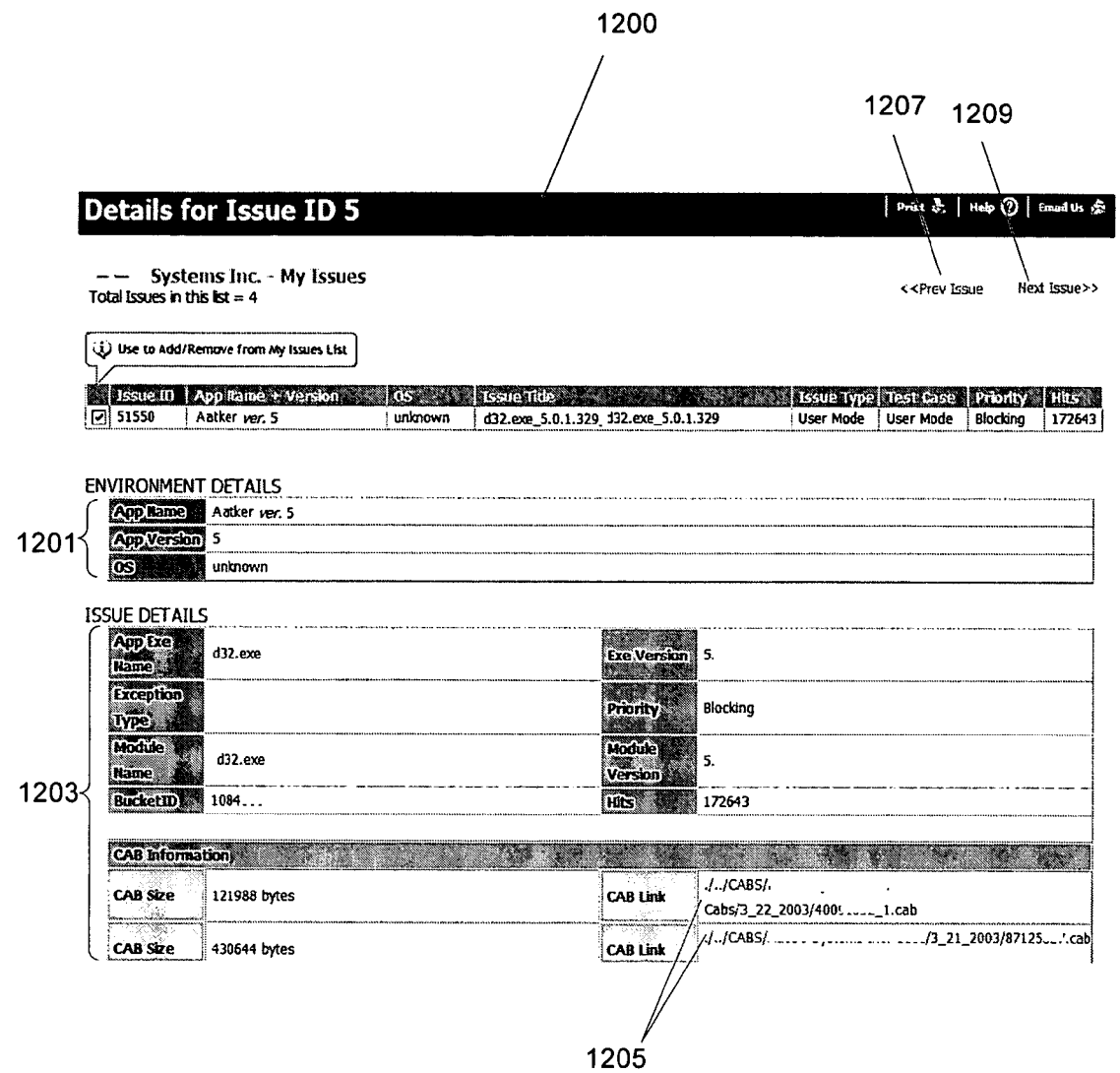
FIG. 12 is a diagram of a user interface for viewing and interacting with an issue detail list according to an embodiment of the invention.

The Issue Detail View 1200 shown in FIG. 12 may be invoked from the issue list view 1100 shown in FIG. 11 as discussed above, or in any other manner as desired. In an embodiment of the invention, the tabular view (with checkbox) should correspond to the view that was visible on the Issue List Page from which the Issue Detail page 1200 was invoked.

The Environment details section 1201 of the page 1200 summarizes the environment data for the environment used to create the issue. This Section shows different data for different types of Issue. For example, for User Mode Issues, the environment field 1201 shows Application Name, Application Version, and OS. For Logo Issues, the environment field 1201 shows Application Name, Application Version, Application Language, OS, and Test Case. For AE Issues, the environment field 1201 shows Application Name, Application Version, Application Language, Application Major Version, Application minor Version, OS, and Test Case.

For Shim Issues, the environment field 1201 shows Application Name, Application Version, Application Language, OS, and Test Case. Shim issues are also known as compatibility fix issues. A compatibility fix data source provides issues that may have been "fixed" in the operating system by the operating system developer. The operating system may use matching information in an embodiment of the invention to determine how to interact with applications when they are installed. Specifically, the matching information helps identify what fixes or messages to deliver for a given application. The compatibility fixes may for example address common application compatibility problems when installing an application originally written for a prior version of the operating system or another operating system. Fixes can provide simple solutions to the most common compatibility problems. For example, a fix might provide an older application with a previous operating system's credentials to enable the application to function properly. An application help message may also provide more information about the potential issue with an application and the steps recommended in order to remedy it.

The Issue Details section 1203 shows additional useful issue details. As with the environment details, these details are different for different types of Issues. For example, for User Mode Issues the Issue Details section 1203 may include information regarding Application Exe Name, Exe Version, Exception Type, Priority, Module Name, Module Version, BucketID, Hits, and CAB Information. The CAB Information table can have multiple CAB Size and CAB Link entries as shown. In an embodiment of the invention, the CAB Link 1205 points to a corresponding CAB file in storage, such as on a CD. If there are no CABs, the section is preferably still shown and the user is informed that there are no CABs available. For Logo Issues, the Issue Details section 1203 may include information regarding Fix Level (for example, 1=Logo Blocker, Fix in Current Version, 2=Logo Blocker, Fix in Current Version, 3=Must Fix in next Version, 4=FYI, Not a Logo Violation), Priority, Title, Submission ID, Logo Type, Description, Reproduction Steps (to reproduce issue occurrence). For AE Issues, the Issue Details section 1203 may include information regarding Title, Priority, Description, and Reproduction Steps. For Shim Issues, the Issue Details section 1203 may include information regarding Title, Priority, Compatibility Fix Layer, Message Type, Application Fix HTML Help ID, HTML Link, Description, and Reproduction Steps.

The "Prev Issue" 1207 and "Next Issue" 1209 links allow the user to navigate within the issue list that invoked this Issue Details page. For example, when the user clicks on an Issue in the "Blocking Issues" List, then the Issue Details page shows the clicked Issue. But the user can use these links to navigate between other Issues in the "Blocking Issues" list.

Figure 13:
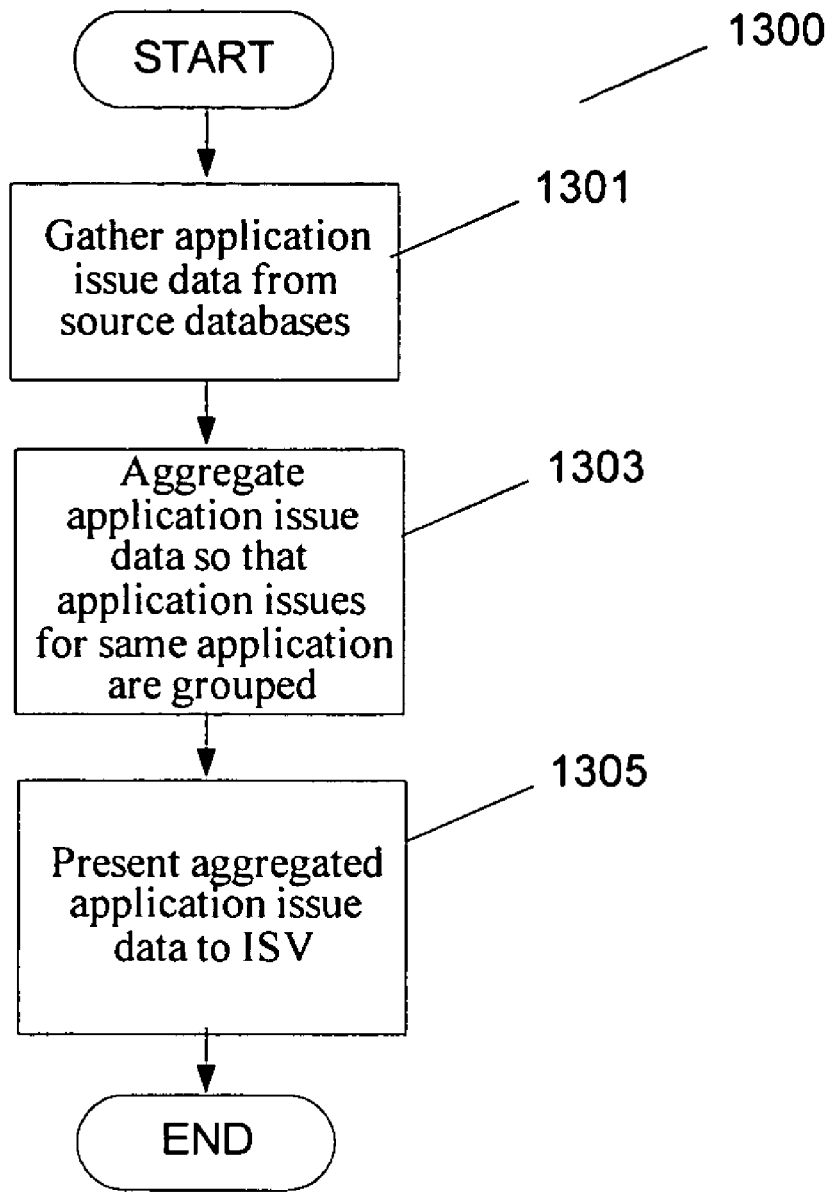
FIG. 13 is a flow chart generally representing the steps taken to prepare data for presentation within a web portal in accordance with an embodiment of the invention.

FIG. 13 is a flow chart generally representing the steps 1300 taken to prepare data for presentation within a Web portal in accordance with an embodiment of the invention. The steps 1300 begin at block 1301. In block 1301, application issue data is gathered from source databases. Next, in block 1303, application issue data is aggregated so that application issues for the same application are grouped. Then, in block 1305, aggregated application issue data is presented to the ISV. After block 1305, the steps end.

It will be appreciated that an improved system and method for application issue aggregation and prioritization have been described. In addition, a presentation schema has been described for effectively conveying the information to the relevant recipients, i.e. the ISVs. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. In addition, the illustrated user interface elements may be modified in arrangement, appearance, content, extent etc. within the invention. Therefore, the invention as described herein contemplates all such embodiments as may come within the scope of the following claims and equivalents thereof.

We claim:

1. A portal server comprising:
a processor; and a memory component communicatively coupled to the processor, the memory component having stored therein computer-executable instructions configured to implement portal aspects of the portal server including:
- a data interface for accessing a plurality of application issue data sources for obtaining application issue data regarding one or more applications associated with a plurality of independent software vendors (ISVs), where the data interface is configured to facilitate access to the application issue data; and
- an aggregation module for aggregating the application issue data to facilitate determining an aggregated application issue data set, the aggregation module configured to aggregate the application issue data by application and as a function of a qualitative priority, and for presenting a customizable user interface that presents the aggregated application issue data set including data pertaining to one or more applications associated with a corresponding ISV of the plurality of ISVs,
  - wherein the data pertaining to the one or more applications associated with the corresponding ISV includes names of the applications associated with the corresponding ISV, a number of blocking issue data items associated with respective instances of the applications associated with the corresponding ISV, a number of quality issue data items associated with respective instances of the applications associated with the corresponding ISV, and a number of compatibility fix issue data items associated with respective instances of the applications associated with the corresponding ISV.

2. The portal server according to claim 1, wherein the aggregation module is further operable to prioritize data included in the application issue data set according to at least one criterion received from an external computing device.

3. The portal server according to claim 2, wherein the at least one criterion includes one or more criteria selected from the group consisting of issue ID, application name, application version, issue type, issue priority, operating system, and number of issue reports per issue.

4. The portal server according to claim 1, wherein the plurality of application issue data sources comprise a database of logo certification test results and a database of user-reported computer crash data.

5. The portal server according to claim 4, wherein the plurality of application issue data sources further comprise an additional database of application experience test data.

6. The portal server according to claim 1 further comprising a network interface accessible by at least one of a plurality of external computing devices.

7. The portal server according to claim 1, wherein at least one of the names of the applications associated with the corresponding ISV is a hyperlink to an issue list comprising application issue data for the corresponding application, at least one of the numbers of the blocking issue data items is a hyperlink to an issue list comprising blocking issue data for the corresponding application, at least one of the numbers of the quality issue data items is a hyperlink to an issue list comprising quality issue data for the corresponding application, and at least one of the numbers of the compatibility fix issue data items is a hyperlink to an issue list comprising compatibility fix issue data for the corresponding application.

8. A user interface comprising:
- at least one processor communicatively coupled to the user interface for carrying out computer executable instructions in connection with user interface processes;
- a login credentials pane, where entry of credentials allows access to application issue data stored in a plurality of data sources;
- a search pane configured to receive an input pertaining to at least one search term, whereby data stored in the data sources is aggregated as a function of the at least one search term and a qualitative priority to determine an aggregated application issue data set; and
- a task pane configured to receive a formatting input pertaining to a preferred format for displaying the aggregated application issue data set; and
- a content pane configured to display the aggregated application issue data set, wherein the display of the aggregated application issue data set includes names of a set of applications associated with a particular independent software vendor (ISV), a number of blocking issue data items associated with at least one application in the set, a number of quality issue data items associated with at least one application in the set, and a number of compatibility fix issue data items associated with at least one application in the set.

9. The user interface according to claim 8, wherein the task pane contains a listing of available formats.

10. The user interface according to claim 9, wherein the listing of available formats comprises a summary format.

11. The user interface according to claim 10, wherein at least one of the application issues has associated therewith number of reports of that issue, and wherein the summary format comprises a graphical illustration of the number of reports associated with respective application issues, respective instances of the application issues in the subset having associated therewith more reports than any of the remaining issues not in the subset.

12. The user interface according to claim 9, wherein the listing of available formats comprises a format wherein at least one of the applications is listed and is visually associated with information regarding application issues for that application.

13. The user interface according to claim 12, wherein the information visually associated with at least one of the one or more applications comprises an indication of the total number of issues associated with that application.

14. The user interface according to claim 13, wherein at least one of the applications issues have one of a plurality of types, and wherein the information visually associated with the one or more applications comprises an indication of the number of issues of at least one type associated with that application.

15. The user interface according to claim 12, wherein the information visually associated with at least one of the one or more applications comprises an indication of the total number of issues associated with that application when used in conjunction with an indicated operating system.

16. The user interface according to claim 9, wherein the listing of available formats comprises a format wherein all application issues associated with the one or more applications are presented.

17. The user interface according to claim 16, wherein at least one application issue has an identifier, and wherein within the format all application issues associated with the one or more applications are presented, and the application issues are grouped by application issue identifier.

18. The user interface according to claim 8, wherein the search pane comprises selectable search filters.

19. A user interface according to claim 8, wherein at least one of the application names is a hyperlink to an issue list comprising application issue data for the corresponding application, at least one number of the blocking issue data items is a hyperlink to an issue list comprising quality issue data for the corresponding application, and at least one number of the compatibility fix issue data items is a hyperlink to an issue list comprising compatibility fix issue data for the corresponding application.

20. A computer-readable storage medium having instructions stored thereon, the instructions comprising:
   instructions to gather application issue data from a plurality of data sources;
   instructions to aggregate application issue data from the data sources as a function of a qualitative priority such that application issue data attributed to a particular independent software vendor (ISV) is accessible through a login protocol;
   instructions to aggregate application issue data from the data sources such that application issue data pertaining to a common application are grouped together; and
   instructions to display the aggregated application issue data, wherein the displayed aggregated application issue data includes names of a set of applications associated with a corresponding ISV, a number of blocking issue data items associated with at least one application in the set, a number of quality issue data items associated with at least one application in the set, and a number of compatibility fix issue data items associated with at least one application in the set.

21. The computer-readable storage medium according to claim 20, wherein the instructions to gather application issue data from a plurality of data sources comprises the instructions to gather the application issue data from a database storing at least one item of user crash report data and a database storing at least one item of test report data.

22. The computer-readable storage medium according to claim 20 further comprising instructions to transmit the aggregated application issue data for visual presentation.

23. A computing device comprising:
   at least one processor;
   means for gathering application issue data from a plurality of data sources;
   means for aggregating application issue data from the data sources as a function of a qualitative priority such that application issue data attributed to a particular independent software vendor (ISV) is accessible through a login protocol;
   means for aggregating application issue data from the data sources such that application issue data pertaining to a common application are grouped together; and
   means for displaying the aggregated application issue data, wherein the displayed aggregated application issue data includes names of a set of applications associated with a corresponding ISV, a number of blocking issue data items associated with at least one application in the set, a number of quality issue data items associated with at least one application in the set, and a number of compatibility fix issue data items associated with at least one application in the set.

24. The computing device according to claim 23 further comprising means for transmitting the aggregated application issue data for visual presentation.

* * * * *